United States Patent [19]
Kirby et al.

[11] Patent Number: 4,518,817
[45] Date of Patent: May 21, 1985

[54] BURIED CONDUCTOR CABLE ENERGY DISTRIBUTION SYSTEM WITH CONDUCTOR LOOP ENCLOSURE

[76] Inventors: James R. Kirby, 406 Lewes Cir., Columbia, S.C. 29210; Donald F. Looney, P.O. Box 685, Irmo, S.C. 29063

[21] Appl. No.: 468,366

[22] Filed: Feb. 22, 1983

[51] Int. Cl.³ .............................. H02G 9/10
[52] U.S. Cl. ...................... 174/38; 137/356; 137/363; 138/105; 350/96.2
[58] Field of Search .............. 174/37, 38, 39, 71 R, 174/72 R; 137/343, 356, 363, 371, 372, 377; 138/105; 350/96.2

[56] References Cited

U.S. PATENT DOCUMENTS

| | | | |
|---|---|---|---|
| 256,866 | 4/1882 | Teal | 174/39 |
| 319,197 | 6/1885 | Cohlman | 174/38 |
| 4,365,108 | 12/1982 | Bright | 174/37 |

FOREIGN PATENT DOCUMENTS

| | | | |
|---|---|---|---|
| 45280 | 2/1932 | Denmark | 138/105 |
| 2711248 | 9/1978 | Fed. Rep. of Germany | 174/37 |
| 58-14807 | 1/1983 | Japan | 350/96.2 |

OTHER PUBLICATIONS

"How to Cut Costs on Those Uncompleted URD Jobs", *Transmission and Distribution*, Jul. 1975, p. 24.

*Primary Examiner*—Laramie E. Askin
*Attorney, Agent, or Firm*—Benjamin G. Weil

[57] ABSTRACT

An energy conducting cable loop enclosure which receives and retains an above-ground loop of a flexible conductor cable in an underground energy distribution system, particularly in a system for the supplying of electrical energy. The main body structure, which is upright in normal placement, is of elongate rectangular shape with an above-ground and a below-ground portion and having an open bottom and a closed top. At the junction of these two portions, supporting feet are located which bridge a hole in the ground, in which the below-ground portion is inserted, to rest on the surrounding ground. A removable front plate provides access to the interior of the above-ground portion. The above-ground portion contains a cable hoop having a radius at least as great as the minimum allowable bending radius of the cable on which a loop of cable is trained after being led through the open bottom and out through the open above-ground front. The depth of the hoop is substantially equal to the depth of the body structure so that the cable loop is captured on the hoop when the front plate is secured in place. The structure is held in place by the anchoring effect of the buried cable by way of the captured cable loop. The dimensional interaction of the structural elements combine for the provision of cable loops of desired size for interfacing with system components. Means are provided to prevent unauthorized removal of the plate.

25 Claims, 4 Drawing Figures

BURIED CONDUCTOR CABLE ENERGY DISTRIBUTION SYSTEM WITH CONDUCTOR LOOP ENCLOSURE

BACKGROUND OF THE INVENTION

1. Field of the Invention

The invention relates to outdoor conductor cable loop enclosures used in connection with buried conductor cable energy distribution systems employing conductor cables of various types such as electric cable, coaxial cable, telecommunications cable or flexible gas conducting cable.

2. Description of the Prior Art

The external transmission cables of an energy distribution system are either constructed as an aerial system or a buried system. In the aerial configuration, the cable and its associated devices are carried by and mounted on elevating means, usually the conventional utility pole. In an underground system, the transmission cables are buried, but above-ground means must be provided to permit interfacing means for distribution of the transmitted energy to the user and for other operating components.

Buried systems have become practical with the development of improved cable and methods of burying the cable, and, especially, with the development of improved insulation and covering impervious to water resulting in cables having a much longer life in subterranean service conditions.

From an operating point of view, the buried system has many advantages. Ice, snow, lightning storms, floods and other natural similar catastrophes and phenomena do not affect or interrupt service to customers. In seacoast and adjacent areas, severe corrosion problems which are encountered in aerial systems due to salt water conditions are reduced to a point where they are practically eliminated. Thus, they are more reliable, an important system characteristic. Buried systems also are more cost effective in that they have lower maintenance costs, and, lastly, they are relatively safer than the aerial type which can offer serious hazards to life and health in the event of conductor cable casualties or failures.

Besides the reliability and operating advantages of buried systems, aerial systems are in conflict with a widespread movement to improve our visual environment. It may be admitted that many aerial systems constitute an eyesore. Consequently, much effort is being expended to place overhead electrical, telephone, CATV cables and the like in underground installations. Indeed, many governmental bodies have adopted legal requirements that all new residential, commercial and industrial subdivisions be initially constructed with complete buried systems and further require that existing aerial systems currently in operation be buried on a scheduled timetable.

In an underground energy distribution system of any type, whether for power, telecommunications or other purposes, provision must be made for the interfacing of the main primary system to the end user by the interfacing of energy conductors and interfacing components. As a result, in the installation of buried cable systems, it is essential to provide access to the cable at certain predetermined locations. In a telecommunications system, such access is necessary to permit splicing of cable ends, to facilitate the attachment of branch lines to the main line, to provide means for the installation of electrical protectors to guard against lightning damage, to permit the installation of loading coils and repeaters for signal improvement and for maintenance and testing. In a fiber optic cable system, as well as the foregoing, such access is necessary for the connection of branch lines and possibly for the installation of conversion means such as an optoelectronic detector like a photo diode or a de-multiplexor or an integrated optoelectronic circuit combining the two types of devices into one integrated optoelectronic circuit. In a system for the distribution of electric power, access is needed for the installation of step-down transformers interfacing to customer service lines and for the installation of power factor correcting capacitors.

To provide access to accomplish such interfacing, it has been customary to provide a loop in the buried cable during its installation underground at predetermined locations for future use. Such cable loops are conventionally either totally buried in the ground for later retrieval by exhumation of the loop or, alternatively, the cable loops may be located above the ground.

Above-ground cable loops must be protected from mechanical damage, without which they would be subject to fracture through forceful entanglement or impact damage, as well as from brush fires or the like. As a result, above-ground cable loops should be held upright and be enclosed for their protection. In the case of power distribution systems, above-ground cable loops must be enclosed for safety reasons.

To illustrate the prior art and the problems which it has not solved, an underground electric power system is presented as an example.

In the installation of underground electric power distribution cables which serve pad-mounted step-down transformers, it is desirable to defer the actual installation of specific transformers until such time as these transformers are required for electric power service to customers. Typically, a coil or loop of cable is fashioned at each future transformer location to facilitate above-ground connection of the cable to the transformer without the necessity of splicing a tap into the buried cable.

As previously stated, it is necessary to cover or mechanically protect these loops of cable for a variety of reasons. Previously, this protection has been accomplished in various ways, such as completely burying the loop or by using a box pedestal structure to enclose an above-ground loop.

Current practice utilizes, ordinarily, a box pedestal that is normally anchored to the ground by cooperating additional structure, either by the use of one or more anchoring stakes that are driven into the ground or by the use of an outwardly turned anchoring flange extending around the bottom portion of the box pedestal which is placed a relatively substantial distance below the ground plane and over which the earth is backfilled and compacted by tamping.

These methods of protecting the cable loop present several inherent problems.

Both the completely buried loop and the box pedestal with buried flange require extensive removal, backfill and compacting of the surrounding earth during installation and retrieval of the cable loop. This practice requires the use, and presence, of additional earth moving equipment and their operators. Likewise, driven anchor stakes require special equipment for their installation and removal. This serves to increase the cost of, and prolong the time involved, in such operations.

An added problem arises in the case of enclosures employing anchoring stakes. The usual practice is to force the stakes into the ground by pounding. Where the stakes are separate from the enclosure, their location must be precisely determined prior to driving them so that the enclosure will be properly located when it is attached to its corresponding driven stake. Further, additional labor is required to properly connect and attach the enclosure to its already fixed in place anchoring stake. To solve this problem, and thus save costs, some enclosures have their anchoring stakes attached before being driven into the ground. When the stakes are already attached to their corresponding enclosure prior to their being driven, such pounding is applied to the top cover of the enclosure. In the event an unanticipated sub-soil obstruction such as a stone or other buried object is encountered by a stake, severe structural damage to the enclosure will occur, which can in some cases destroy its utility and certainly will cause it to lose its designed shape. This, too, has its cost aspects.

Further, it has been found in operating use that the channel shaped stake type pedestal ordinarily employed lacks rigidity and robustness and, thus, does not adequately protect the cable loop against vandalism or tampering.

Another problem associated with the prior art is the disturbance of the compactness of the soil around the cable loop caused by the above-mentioned digging, which increases the likelihood of undesirable settling or soil wash-out occurring after the installation of a pad-mounted transformer.

Yet another problem associated with the prior art is the difficulty involved in obtaining cable loops of the exact size desired. If the cable loop is too small to reach the interfacing device, such as a transformer, one or more jumper sections of cable must be spliced in. If too large a loop is provided, expensive cable must be pruned and, consequently, wasted. While these difficulties can be minimized by careful individual measurement of each and every loop of the many in a system, this measurement must be carefully done and requires skilled labor using special tooling and measuring gauges. This, too, has cost aspects.

Still another problem associated with the prior art is that no provisions are made in the pedestal enclosures which serve to prevent the cable loop from being bent past its minimum allowable bending radius and thereby suffering structural and conductive damage.

Besides lacking preventive structure to avoid excessive bending of the cable, the prior art teaches the use of multiple component clamping means, post means or combinations thereof for supporting the cable forming a loop. Such construction requires multiple adjustments of these components and the cable until the cable is properly positioned. This, too, requires additional time, more skilled labor and the use of special tools, with their attendant costs.

The foregoing emphasized the problems encountered by the electric power utility industry in providing an underground energy distribution system. However, it is readily apparent to those skilled in the art that these problems are not unique to the electric power industry. Similar problems are also encountered by other utility industries that employ underground energy distribution systems using flexible conductor means such as multiple conductor communications cables, coaxial cables, fiber optic cables and flexible gas pipelines.

SUMMARY OF THE INVENTION

The present invention consists of a flexible energy conducting cable loop enclosure for use in a buried or underground system for the distribution of energy by means of such cable. In particular, it relates to a system and a cable component thereof used for the supply of electrical energy for an electric power system. However, the invention as disclosed will provide a cable loop enclosure that is adapted to a wide variety of underground conductor facilities and to a wide variety of cables for use therein. In addition to electric power systems, the invention may be used in underground systems for telecommunications data, CATV and the like which may employ multiple conductor cable, coaxial cable or fiber optic cable. It may be also be used in systems employing flexible gas lines as a conductor cable.

The cable loop enclosure is an enclosing structure which receives and retains an above-ground loop of the buried cable and which is of elongate rectangular shape and is normally upright in placement. It has a main body consisting of above-ground and below-ground portions assembled into a uniform cross-sectional enclosure. At the junction of these two portions, a supportive foot is located on each side of the enclosing structure which bridges the hole in the ground above the cable through which the cable loop protrudes above the ground and into which the below-ground portion of the enclosure is inserted. These feet extend a distance beyond the lip of the hole. The above-ground portion has an open front and the below-ground portion has an open bottom. A removable cover plate fits over the open front of the above-ground portion and is secured in place by locking means. The above-ground portion has a closed top. The above-ground portion contains an internal cable loop hoop attached to its inside rear wall on and around which a loop of cable is trained after being brought into the enclosure through the open bottom and out through its open above-ground front. The depth of the cable loop hoop is substantially equal to the depth of the main body structure so that when the removable cover plate is placed over the open front to complete the enclosure, the loop is captured and cannot escape from the hoop.

During installation the loop is trained tightly over the hoop. As a result, the structure is held in place by the anchoring effect of the buried cable by way of the captured cable loop. The feet serve to transfer the load to the ground plane and to anchor the enclosure in place by engagement with the ground. Such anchoring eliminates the labor and equipment associated with the installation and removal of enclosures stabilized by buried flanges and also eliminates the need for special equipment and additional labor associated with the installation and removal of enclosures anchored by driven stakes.

The dimensional interaction of the structural elements automatically results in the provision of cable loops of a desired size for interfacing with service provisions or system components. The cable hoop is located a predetermined distance on the rear wall with respect to the feet, which in turn, locate the hoop with respect to the ground plane. Thus training the cable loop over the hoop (which is located a predetermined distance from the ground plane by the feet which rest on the ground plane) allows and assures the correct length of cable in the above-ground loop as is required for future use. This approach eliminates the problems of the prior art wherein a desired size of cable loop was not automatically provided with consequent waste of time and money.

Further, the use of cable loop enclosures according to the invention having similar dimensions throughout a system results in the unfailing provision of cable loops of a predetermined optimum size. This provides a saving in time and labor over the prior art.

Removal of the cable loop from the cable hoop by simply pulling it out the open front of the enclosure and then feeding it through the open bottom releases the enclosure of the invention and allows the enclosure to be simply lifted from the ground. This method avoids any significant disturbance of soil compactness in contrast to the prior art which requires backfilling and tamping of the soil disturbed by the removal of prior art enclosures. The foregoing applies not only to the removal of buried flange type enclosures, but also to the disturbance in the surrounding soil caused by the loosening and removal of driven stakes.

Again, the hoop, over which the cable loop is trained, is constructed with a sufficiently large radius so as to prevent the cable forming the loop from being bent past its minimum allowable bending radius. Such construction serves to automatically eliminate a source of cable damage or failure not found in the constructions of the prior art.

Likewise, the use of the simplified single structural element of a cable hoop for retaining and supporting the cable loop eliminates the multi-component structures of clamps and supporting posts found in the prior art, as well as the multiple adjustments necessary to fit the cable loop into place in such constructions. Such simplified structure not only reduces the number of parts required, but reduces the time involved in the installation of the enclosure of the invention by simplifying the operations required, eliminates the need for special tools for such operations and permits the use of unskilled labor. All these advantages provide significant cost savings.

As is readily apparent, use of the invention eliminates the earth moving operations involved in the installation and removal of buried cable loops, as well as the extensive disturbance of the soil involved in the use of this method of protecting the cable loop. As previously stated, these problems are also eliminated in the cases of enclosures anchored by buried flanges.

Likewise, the use of the invention removes the requirement of the prior art for special equipment and extra labor when stake supported or stake mounted enclosures are used. In the case wherein the stakes are separately driven into the ground, the labor of fitting the enclosures to the stakes is also eliminated. In the case wherein the stakes are integral with the enclosure, the stakes are usually driven into the ground by a series of forceful impacts on the top of the enclosure. This operation not only requires special driving equipment and additional labor, but can cause damage to, or even structural failure of, the enclosure.

Accordingly, a general object of the present invention is to provide an improved cable loop enclosure that overcomes the problems of the prior art described in the Background of the Invention, and, in addition, has other important advantages and features.

A more specific object of this invention is to provide an improved construction which is more cost effective than the constructions of the prior art.

Thus, a particular object of this invention is to provide an improved enclosing structure for an above-ground cable loop so constructed as to offer an anchoring means which will significantly reduce the labor associated with the installation and removal of the enclosure, especially the labor associated with soil removal and backfill.

It is again an object of this invention to provide an improved enclosure of the type described so constructed as to eliminate the need for special equipment for the purpose of installation and removal of the enclosure.

A further object of the invention is to provide an improved enclosing structure of the type described so constructed as to virtually eliminate disturbance of the compactness of the soil around the cable loop during the removal of the enclosure.

A still further object of the invention is to provide an improved enclosing structure of the type described so constructed as to provide measuring means which will assure that the cable contains an ample amount of cable to perform future connections with system components.

Another important object of the invention is to provide an improved enclosing structure of the type described so constructed as to provide means to prevent the cable loop from being bent past its minimum allowable bending radius.

DESCRIPTION OF THE PREFERRED EMBODIMENT

Figure 1:
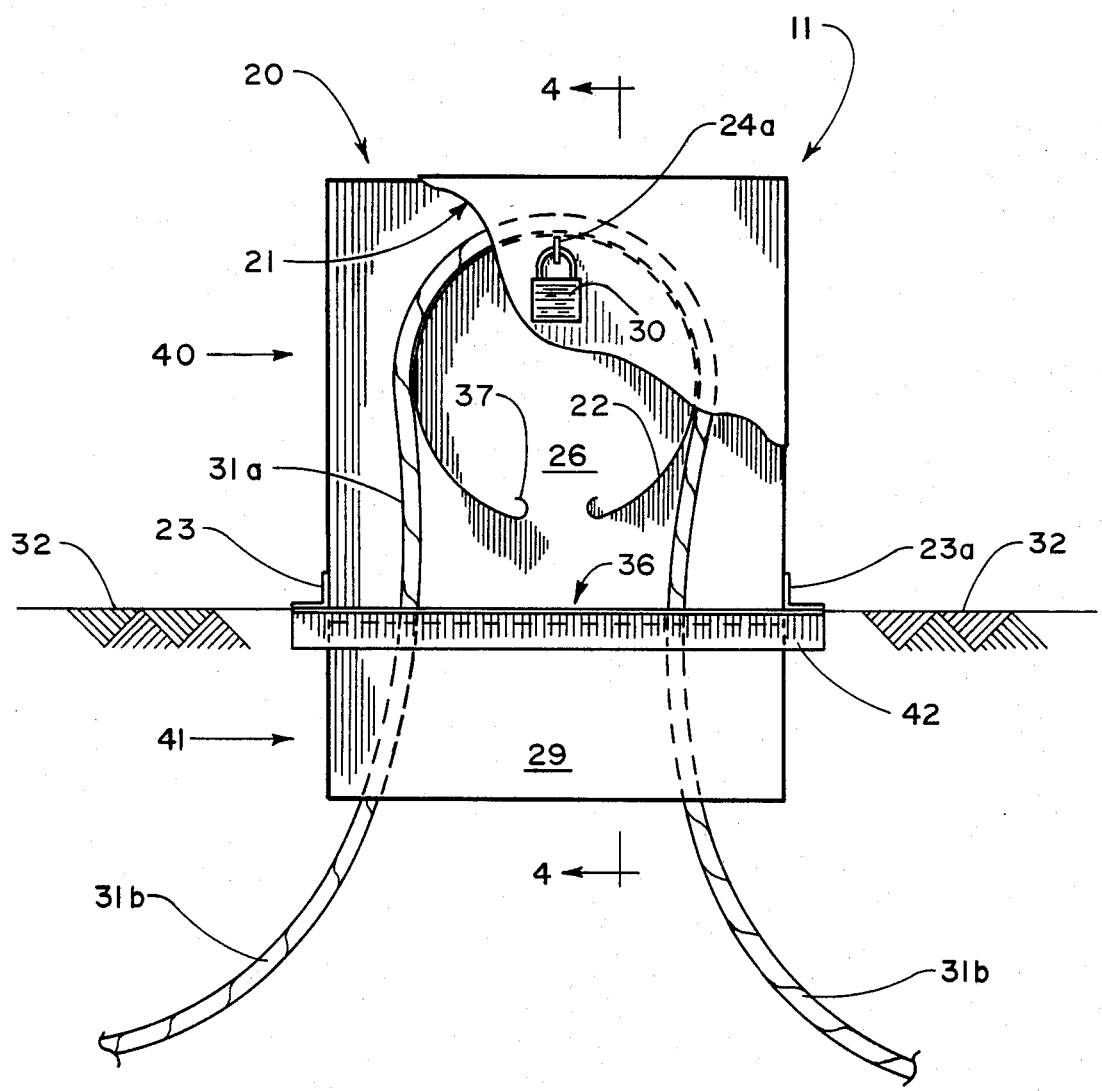
FIG. 1 is a schematic drawing of an energy distribution system embodying the invention showing the primary conductor and a fragmentary view of the exterior of the enclosure broken away to show simplified internal arrangement of the primary cable looped over its cooperating hoop.

Referring now to the drawings generally, and particularly to FIG. 1, a conductor loop enclosure 11 is illustrated embodying the principles of the invention, but particularly adapted for use with an underground energy distribution system. In general, the conductor loop enclosure, as shown in FIG. 1, includes a four-sided elongate main body member 20. Main body member 20 has an above-ground portion 40 with an open front 39 and a closed top 28, a below-ground portion 41 with a closed front 29 and an open bottom 33 surrounding open-ended box-like cavity 45, and a removable cover plate 21. Cover plate 21, as will hereinafter be described, is constructed so as to cooperate with main body 20 to close off open front 39 of the above-ground portion 40 of main body 20. Below-ground portion 41 is embedded in the ground 32 directly above the conductor cable line for which it is to be used and immediately adjacent to the point in the underground cable system 31b at which it is desired to include an above-ground loop 31a of conductor cable. Feet 23 and 23a are attached to the exterior surfaces of the side walls 27' of main body member 20 and are located at the junction of the above-ground portion 40 with the below-ground portion 41 of main body 20. Contained within the main body member 20 is a conductor cable hoop 22 attached to the rear wall 26 of main body 20.

Figure 3:
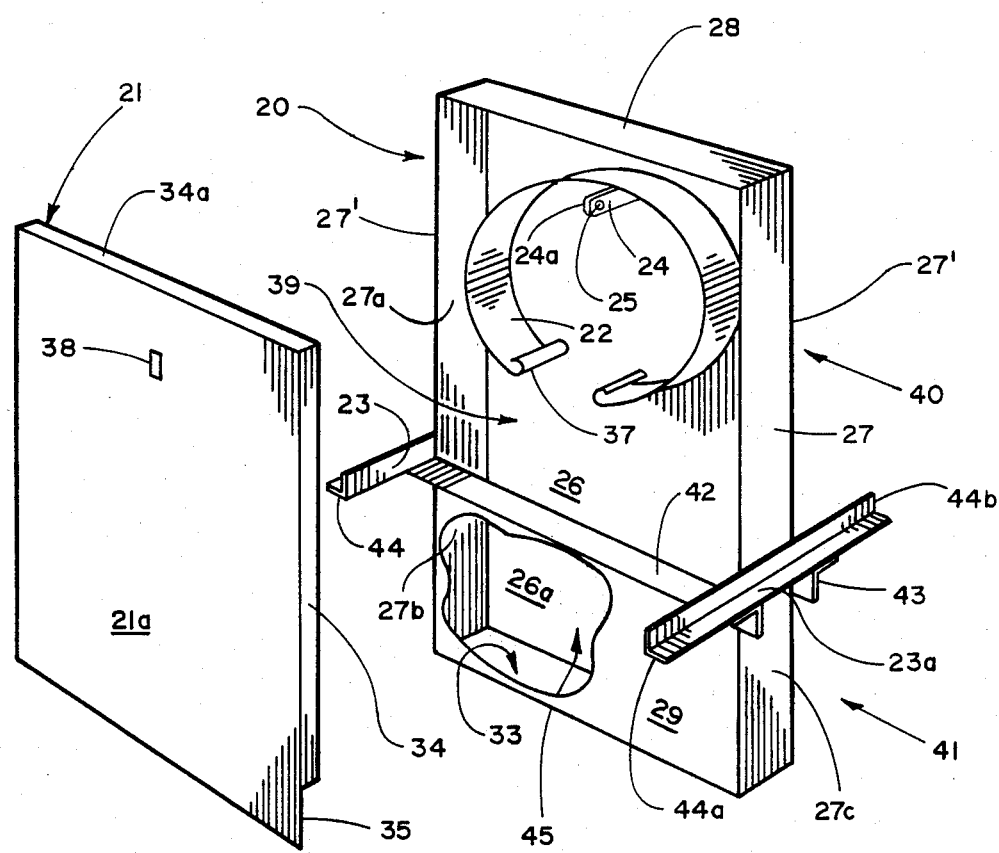
FIG. 3 is a perspective view of a cable loop enclosure embodying the principles of the invention with the front cover removed and not installed in the ground.

As best shown in FIG. 3, the main body member 20 is essentially a box-like structure designed for partial insertion in the ground. In a typical installation, the below-ground portion 41 extends 12 inches below the ground plane 32. The above-ground portion 40 of main body 20 is comprised of two dimensionally corresponding side walls 27 and 27a, a rear wall 26, an open front 39 and an enclosing top cap section 28. The below-ground portion 41 is composed of two corresponding extensions 27b and 27c of side walls 27 and 27a, a rear wall 26a comprising an extension of rear wall 26 and an open bottom 33 enclosing an open ended box structure generally rectangular in cross section. The above-ground portion 40, the below-ground portion 41 and the cap section 28 of main body 20 are assembled into a uniform cross-sectional main body 20, as shown in the drawings. In a typical installation, the outside depth dimension of side walls 27, 27a, 27b and 27c would all be 6 inches, and the above-ground portion 40 of main body member 20 would extend 30 inches above the ground plane 32.

The main body 20 is preferably constructed of sheet metal, preferably galvanized, but any appropriate engineering material such as fiber glass reinforced plastic may be used. A typical installation would employ galvanized 14 gage sheet steel. In a power distribution system, such an enclosure has important safety features by providing a conductor loop enclosure at ground potential. In some applications, a non-metallic construction would be preferable, and the loop enclosure and its components may be made of fiber glass reinforced plastic or any other suitable non-metallic material.

Conductor hoop 22, preferably generally an arc of a circle in cross section and thus cylindraceous in shape, is attached to the rear wall 26 of the above-ground portion 40 of main body 20, extending anteriorly towards open front 39 and with its axis of rotation substantially normal to the plane of rear wall 26. The depth of hoop 22 is typically equal to the depth dimensions of side walls 27 and 27a. Thus, the depth of the hoop 22 in a typical installation wherein the side walls are six inches deep, as previously described, would likewise be six inches. The location of the center of the arc of hoop 22 may be located at any dimensionally favorable point on the above-ground portion of rear wall 26. It is preferably located horizontally at the center of the width dimension of rear wall 26. However, the size of the conductor loop desired will affect the vertical location of its center. As will later be described in detail, the hoop 22 must be located on the rear wall 26 at a predetermined distance with respect to the feet 23 and 23a to ensure a sufficient height of cable loop above the ground plane 32. Consequently, the center of the arc of the hoop is not necessarily at the geometric center of rear wall 26.

In addition, conductor hoop 22 must be dimensioned so that the radius of curvature of conductor hoop 22 is larger than the minimum bending radius of the cable of the conductor cable 31b employed in the system thereby preventing the cable 31b forming the cable loop 31a from being bent past its minimum allowable bending radius when it is trained over and around cable hoop 22. This minimum allowable bending radius varies from size to size, construction, and type of conductor cable employed in cable system 31b. However, data respecting this is readily available from a number of sources well-known to those skilled in the art, such as from the cable manufacturer, industry standards or electrical codes. In the typical installation using one inch diameter electrical primary power cable as an example, a minimum hoop radius of nine inches would be employed.

Conductor hoop 22 is formed preferably from galvanized sheet metal, but may be formed from other appropriate engineering materials, as previously described. It may be attached to rear wall 26 by welding or other suitable means. Such attachment not only supports the hoop 22, but serves to stiffen rear wall 26. The exterior edges of conductor hoop 22 are fitted with means to prevent chafing of the cable loop 31a as it is positioned about hoop 22. FIG. 3 illustrates one construction for such purpose employing inwardly curving ends 37 of a small radius. Alternatively, a bead may be provided on these edges.

Figure 2:
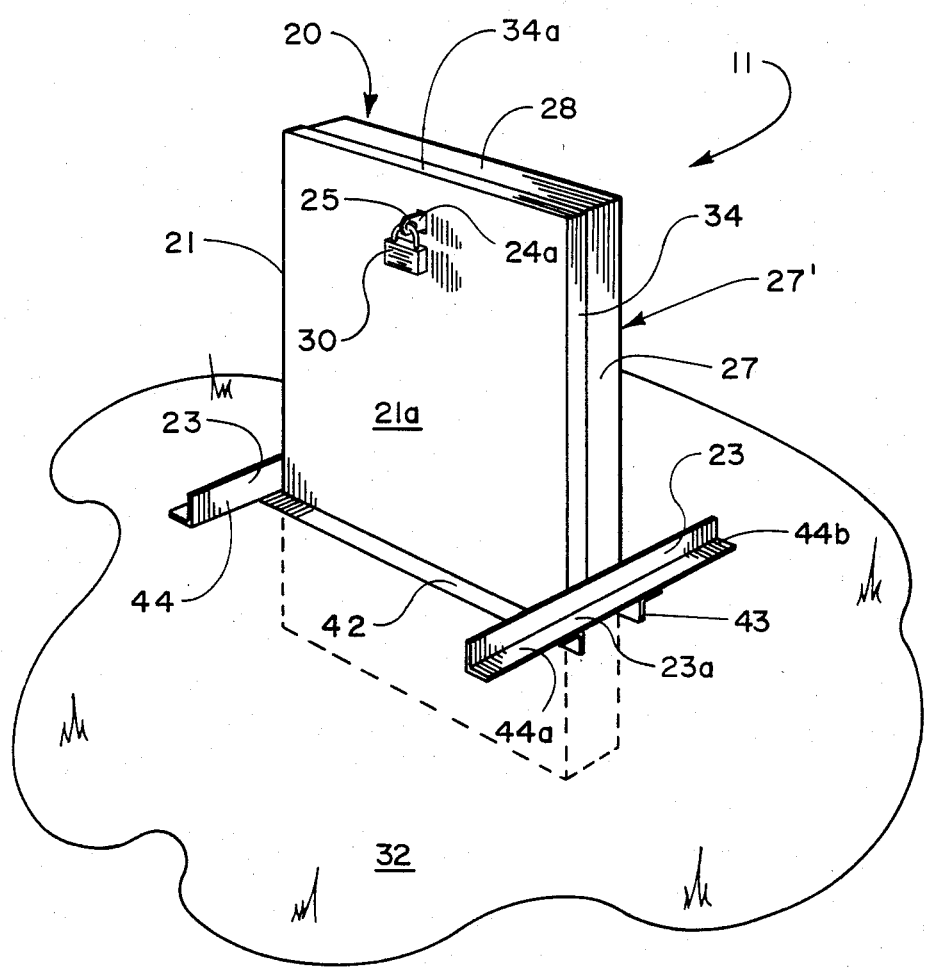
FIG. 2 is a perspective view of the exterior of a cable loop enclosure embodying the principles of the invention and installed in the ground.

A lock strut 24 extends anteriorly from an attachment point on rear wall 26 along the inside periphery of conductor hoop 22 at its apogee past the open above-ground front 39 of main body 20. Lock strut 24 terminates at its outer end in lock tab 24a, which is provided with hole 25 and which corresponds to and extends through tab hole 38 in cover plate 21. An appropriate locking device, such as padlock 30, is engaged through hole 25 in lock tab 24a to lock cover plate 21 securely in place as shown in FIG. 2. Lock strut 24 is preferably constructed of galvanized sheet metal heavier in gage than conductor hoop 22. A grounding wire (not illustrated) may be fitted to run from an attachment fitting on lock strut 24 to appropriate grounding means as a safety feature.

Figure 4:
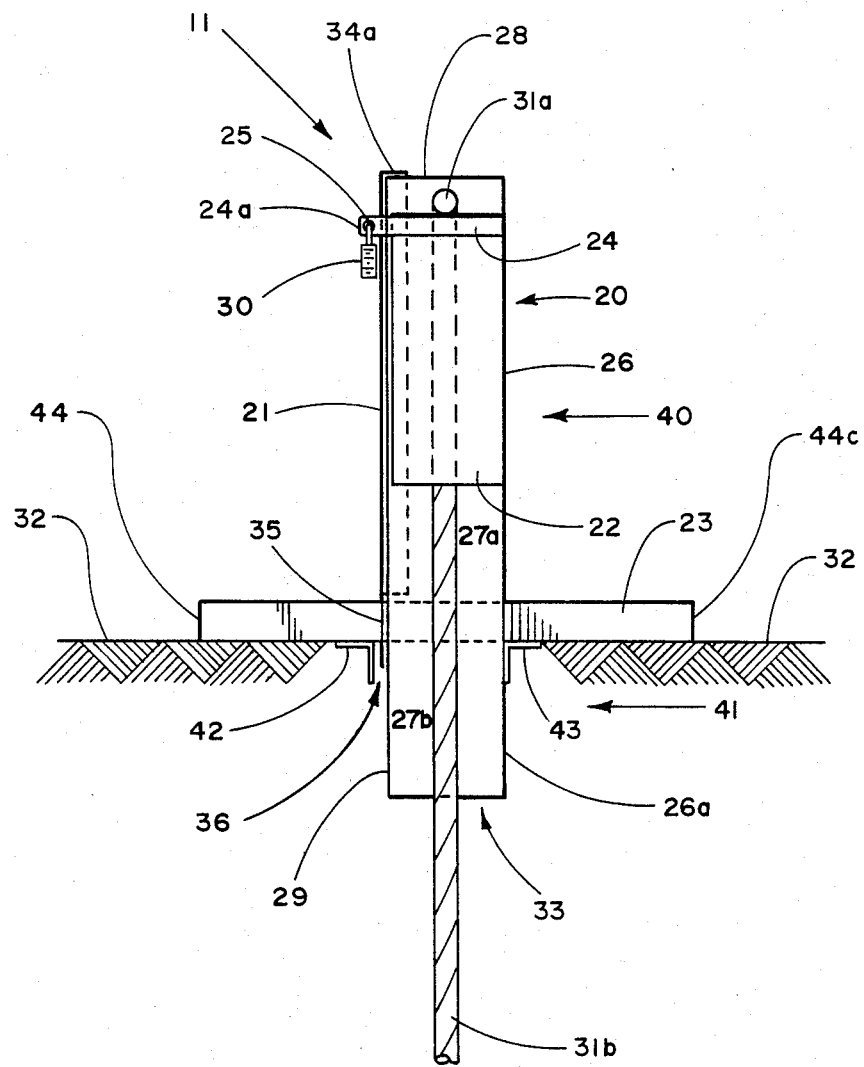
FIG. 4 is a side elevation of the enclosure shown in FIG. 3 installed in the ground taken along line 4—4 of FIG. 1.

Cover plate 21 is essentially channel shaped in cross section, having a flat front plate member 21a substantially corresponding in its dimensions with the opening in open front 39 so as to completely cover the opening of open front 39 of the above-ground portion 40 of main body 20, thereby completely enclosing its interior including conductor loop 31a when cover plate 21 is fitted in place. The cover plate 21 is provided with integral side flanges 34 which overlap side walls 27 and 27a and top flange 34a which overlaps the closed top portion 28 of main body 20. When cover plate 21 is installed in place, the front edges of sides 27 and 27a and top 28 fit within these respective overlapping flanges. The lower edge of cover plate 21 is provided with a flat tab 35 which engages a retaining slot 36 formed between front transverse foot bracket 42 and front wall 29 as shown in FIG. 4. As previously described, front plate member 21a is provided with tab hole 38 designed to correspond to, and to cooperate with, locking tab 24a. Locking tab 24a extends through tab hole 38 when cover plate 21 is in place so that cover plate 21 may be locked in place to prevent unauthorized opening of the cable loop enclosure. Cover plate 21 may also be formed of sheet metal, preferably galvanized. As has also been previously described, the depth of cable hoop 22 is essentially equal to the depth of the side walls 27 and 27a of main body 20. As a result of this construction, cable loop 31a is completely captured upon conductor hoop 22 when cover plate 21 is installed in place covering open front 39 in main body 20 since the flat face 21a of cover plate 21 will fit up against the external edge of hoop 22 leaving no room for cable loop 31a to escape.

Feet 23 and 23a are located at the points where the above-ground portion 40 of main body 20 joins the below-ground portion 41 thereof on side walls 27 and 27a, and are attached to their respective side wall by welding or other appropriate means. They extend along the side walls 27 and 27a from the front to the rear of main body 20 in the same plane parallel to each other and in a plane substantially parallel to the axis of rotation of conductor hoop 22. As shown in the drawings, feet 23 and 23a are right-hand and left-hand counterparts, as are their supporting brackets 42 and 43.

Feet 23 and 23a are supported by feet brackets 42 and 43 extending transversely across the front and the back of the main body 20 substantially in the same plane as feet 23 and 23a. Rear bracket 43 extends across rear wall 26, being attached thereto by welding or other suitable means, and is joined at its extremity to feet 23 and 23a by similar methods. Referring to FIG. 3, front bracket 42 spans the open front 39 of main body 20 and is similarly joined to the feet 23 and 23a. As illustrated in FIGS. 2 and 3, the ends of foot brackets 42 and 43 project beyond front and rear walls 29 and 26 of main body 20 under feet 23 and 23a to form a supporting shelf for each foot member which cross over and rest on their cooperating foot brackets. Feet 23 and 23a and foot brackets 42 and 43 are joined together at their respective crossover points as, for example, by welding or other suitable means, to form a unitary structure. As is readily apparent from the drawings, the feet 23 and 23a and the foot brackets 42 and 43 combine structurally to form a box girder providing enhanced structural capability. Such structural capacity is very desirable, since these elements serve in combination to transfer the combined load of the cable loop and the enclosure to the ground plane. In a typical installation, the feet and brackets are fabricated from $1\frac{1}{4}$ inch galvanized angle iron, with the inferior bracket members facing downwards and the superior feet members facing upwards, as shown in FIGS. 2 and 3.

As is also apparent from the drawings, feet 23 and 23a extend substantially equal distances beyond the side walls 27 of main body member 20. Such extensions, bearing numerals 44, 44a, 44b and 44c, respectively, are necessary for the effective functioning of the loop enclosure and to obtain the benefits of the invention. The feet 23 and 23a must extend a sufficient distance on either side of sides 27 and 27a of main body member 20 to bridge across the hole in the ground 32 into which the below-ground portion 41 of main body member 20 is inserted. The feet must also extend an appropriate distance beyond the edges of that hole to distribute the combined load of the cable loop plus its enclosure to the ground plane. In a typical enclosure in which the conductor cable is buried in a trench six inches wide, and thus sides 27 and 27a are both six inches wide, the feet extensions 44, 44a, 44b and 44c will extend nine inches beyond each edge of sides 27 and 27a. In such an exemplary configuration, the total length of feet 23 and 23a will each be 24 inches.

Feet 23 and 23a have a plurality of important functions. They provide a ground plane reference correctly positioning the cable loop enclosure at the correct level desired with respect to the ground plane. Since feet 23 and 23a locate the main body enclosure 20 with respect to the ground plane 32 and being that cable hoop 22 is attached to the rear wall 26 of body enclosure 20, feet 23 and 23a consequently serve to locate cable hoop 22 with respect to the ground plane 32 so as to ensure a sufficient height of cable loop 31a above the ground plane 32. Also, they stabilize the attitude of the enclosure by providing resistance to forces tending to displace the enclosure from its upright position. Likewise, they act as handles for carrying the enclosure from location to location, and for handling during their installation or removal. Further, since they provide a reference with respect to the ground plane thereby also locating the conductor hoop with respect to the ground plane to ensure provision of a cable loop of ample size for the purpose intended, they serve to align the conductor loop enclosure to be a cable measuring device. Thus, if a plurality of cable loop enclosures of uniform dimensions are employed in a distribution system, they will be uniformly aligned with respect to the ground plane and, therefore, provide cable loops of uniform size throughout the distribution system. The cable loops, besides being all of adequate size, can be uniformly no larger than required by system design criteria thereby saving the cost of excess expensive cable. The cumulative unnecessary expense of many small excessive lengths of cable can be dismayingly substantial in a large system employing many miles of cable and the use of the invention consequently eliminates the occurrence of this undesirable unnecessary cost. Likewise, uniform loops result in simplification of methods and time in introducing interface means to tap the energy transmitted by the cable, which provides significant cost advantages.

Cable 31b, from which cable loop 31a is formed, may be selected from a wide variety of cable configurations. As is readily apparent to those skilled in the art of energy transmission systems, the cable loop enclosure of the invention will find utility in many different types of systems. The sole non-variable parameters in its employment are that it be an effective conductor of the type of energy to be distributed, that it be sufficiently flexible to be formed into a cable loop of suitable configuration and that, since the cable is to be buried, it be constructed so as to be designed for direct burial in the earth.

Thus, while the specific embodiment previously described for the purpose of teaching the invention relates primarily to its use in connection with a system for the distribution of electrical energy for power purposes, it may also be used in other types of systems for the distribution of electrical energy. Other types of systems for the transmission of electrical energy in which the invention may be used include telecommunications systems for the transmission of information over a distance such as cable, telephone, radio, telegraph, data, teleprinter and television systems or combinations thereof. Also included are such other and further systems wherein electrical energy is modulated to provide useful information.

In addition to the distribution of electrical energy, the cable loop enclosure of this invention finds utility in connection with systems for the distribution of other forms of energy. In particular, it is useful in systems employing newly developed flexible hollow cables for the distribution of natural or synthetic fuel energy in the liquid or gaseous state, such as natural gas. Likewise, it is at least as useful in systems employing fiber optic cable in which light energy is modulated to transmit useful information. Such fiber optic systems include both telecommunications and transducer systems.

In view of the wide spectrum of utility for the invention, it appears to be significant to define the terms "cable" and "conductor cable" which are used interchangeably herein to describe the same construction. The term "cable", as used herein, is broadly defined to include cable configurations for the conduction of electrical energy, light energy and fuel energy. While the Bureau of Standards defines "electric cable" as a rope-like conductor of electric current composed of a group of wires usually twisted or braided together known as a "single conductor cable" or a second species of cable consisting of a combination of conductors insulated from each other known as "multiple conductor cable", the term as used herein also includes a solid wire heavily insulated and covered that is not included in the Bureau of Standards definition. The term "cable" also includes "coaxial cable", either alone or in combination with other types of cable. As previously stated, the term "cable" includes cable composed of optic fibers, including fiber optic cables of either multi-mode or mono-mode fibers. Further, it includes hollow flexible cable for the transmission of fuel energy in the gaseous or liquid state. Hence, the term "conductor cable" or its shortened form "cable" as used herein is broadly defined as flexible conductor cable adapted to be buried in the ground for the transmission of energy, whether electric, light or fuel energy.

FIG. 1 depicts a typical installation of a fully assembled cable loop enclosure 11 showing a loop 31a of conductor cable 31b trained over a cooperating cable hoop 22.

At the selected point of installation of the loop enclosure 11 in the cable system, a selected amount of cable slack is pulled up from the cable while it is being buried to form a cable loop 31a of sufficient height to be draped upon and around conductor cable hoop 22. The length of this selected amount of cable is dependent upon the height of the cable hoop 22 above the ground plane 32, upon the radius of cable hoop 22 and the depth at which the conductor cable 31b is buried. Such length is readily ascertained through measurement of the depth at which the cable is buried, by measurement of the cable loop and the performance of simple calculations. When the cable loop enclosures of this invention are identical in construction, this length of cable to form the desired loop will be uniform throughout the system since it is customary to bury cable at the same depth throughout a system. Hence, this selected amount of cable will be constant and its length need only be calculated once. In a typical system, the cable is buried to a uniform depth of 36 inches. A hole is then dug in the ground 32 about the cable loop 31a to receive the below-ground portion 41 of the main body 20 of the loop enclosure 11. The hole preferably is just deep enough to comfortably receive the below-ground portion 41 and just large enough in cross section for the below-ground portion 41 of main body 20 to fit snugly therein in an upright position, yet small enough to be bridged by feet 23 and 23a. It is essential that feet 23 and 23a extend beyond the lips of this hole to bridge the hole and thus support the weight of the cable loop 31a and its enclosure 11. For a typical system in which the enclosure 11 is six inches wide, feet 23 and 23a extend nine inches beyond each side of sides 27 and 27a to bridge a hole six inches wide.

To commence the installation of the loop enclosure 11, the main body member 20 is placed over the conductor cable loop 31a. Then, the cable loop 31a is guided into the open bottom 33 of the below-ground portion 41 of the main body member 20, and, thereafter, out through the open front 39 of the above-ground portion 40 of main body 20.

After this action is accomplished, the below-ground portion 41 of the main body 20 of the cable loop enclosure 11 is then inserted into the hole in the ground 32 into which it extends a predetermined depth as determined by the location of feet 23 and 23a on sides 27 and 27a of the main body 20, which bridge the hole in the ground 32 as previously described. The feet 23 and 23a, as likewise previously taught, function to properly support the full combined weights of the cable loop enclosure 11 and the cable loop 31a by transferring and distributing their combined load to the ground 32 upon which they rest and also to locate the cable loop enclosure 11 with respect to the ground plane 32.

The conductor cable loop 31a is then trained over and around the cable hoop 22 and tightened into intimate contact with cable hoop 22 so as to ensure that the full weight of cable loop 31a is borne by cable hoop 22 and that, as a result of such static load, cable loop 31a is held securely in place by frictional engagement with cable hoop 22.

Burying of the cable 31b then continues downstream from the cable loop enclosure 11 which further serves to stabilize cable loop 31a in place.

The end result is that the cable loop 31a is then positioned in a plane substantially normal to the axis of rotation of the cable hoop 22 and the loop enclosure 11 is held fixed in place by the combined anchoring effect of cable conductor loop 31a and the underground cable system 31b.

Next, the hole in the ground 32 around the below-ground portion 41 of main body 20 and the cavity 45 within its interior are filled with soil and the soil is tamped to secure the buried cable 31b and the main body 20 in place.

To complete the installation of the cable loop enclosure 11, cover plate 21 is positioned over the open front 39 of the main body member 20. Flat tab 35 on the lower edge of cover plate 21 is inserted in retaining slot 36 as shown in FIG. 4. Side flanges 34 of cover plate 21 are positioned to overlap side walls 27 and 27a, and the top flange 34a is positioned to overlap top 28. This engaging action of tab 35 and flanges 34 and 34a serve to hold cover plate 21 in place. Cover plate 21 is further secured by using lock tab 24a which is an extension of lock strut 24 extending through tab hole 38 in cover plate 21. An appropriate locking device 30, like a padlock, is inserted through tab hole 25 in lock tab 24a as shown in FIG. 2, thereby locking the installed cover plate 21 in place.

When the cover plate 21 is installed, as described, the cable loop 31a will be completely captured upon cable hoop 22 and cannot be displaced from the cable hoop 22 until the cover plate 21 is removed. Such capturing is the result of the dimensional interaction of the various elements of the invention, and, in particular, results from the depth of cable hoop 22 being substantially equal in width to the width of corresponding side walls 27 and 27a of the main body 20 which, in turn, causes cover plate 21 to fit substantially flush against the outboard edge of cable hoop 22. As a result, no room exists for the cable loop 31a through which it can escape. Such interaction is clearly illustrated in FIGS. 1 and 4.

A sufficient height of cable loop 31a above the ground plane 32 is assured by the dimensional interaction between the location of cable hoop 22 on the rear wall 26 of the main body 20 with respect to feet 23 and 23a. Cable hoop 22 is located at a selected height above feet 23 and 23a. Since feet 23 and 23a locate the main body 20 of the cable loop enclosure 11 with respect to the ground plane 32, it follows that cable hoop 22 is also located at this selected height above ground plane 32. When the cable 31b is draped on and around the cable hoop 22 as previously described, the location of the cable hoop 22 automatically results in the formation of a cable loop 31a of the desired configuration.

The cable loop enclosure 11 may be readily removed from cable loop 31a at the desired time. The locking device 30 is removed from lock tab 24a. Cover plate 21 is then disengaged from lock tab 24a and lifted, thus freeing flat tab 35 from its retaining slot 36. Cover plate 21 is removed and open front 39 of main body 20 and the cable loop 31a within it are exposed. By slipping cable loop 31a outwardly off hoop 22 through the open front 39, the main body 20 is freed from the combined anchoring effects of cable loop 31a and the buried cable 31b. Such action permits the cable loop enclosure 11 to become movable. Main body 20 is then lifted from the ground by engaging lifting means with feet 23 and 23a, as cable loop 31a is guided inwardly through open front 39 and out of open bottom 33. Cable loop 31a is now freely available for connection to appropriate interface means to provide usable energy to a secondary distribution system.

While a particular embodiment has been disclosed herein, it will be understood by those skilled in the art that many variations thereof and modifications thereto can be made to the disclosed embodiment without departing from the scope of the invention. The disclosed embodiment herein is purely illustrative and is not, in any sense, intended to be limiting. Therefore, it is emphasized that the invention encompasses variations and modifications which fall within the spirit of the appended claims.

We claim:

1. A conductor loop enclosure for enclosing a loop of an underground flexible energy conductor buried beneath the ground-plane, which loop extends above the ground-plane at a selected location, comprising:
    (a) an enclosing structure for insertion about a conductor loop having an open front above-ground-plane portion and an open bottom below-ground-plane portion for extending a predetermined distance below said ground-plane;
    (b) movable cover means to close off said open front of said enclosing structure;
    (c) hoop means within said enclosing structure having a depth substantially equal to the inside depth of said enclosing structure on which a loop is to be placed in a freely movable mode for its support and on which hoop means a loop will be completely captured within said enclosing structure when said cover means is in place thereby holding said enclosing structure fixed in place by the combined anchoring effect of a conductor loop of a buried conductor; and,
    (d) feet means attached to said enclosing structure at the junction of the above-ground-plane portion and the below-ground-plane portion of said enclosing structure arranged so as to both correctly locate said enclosing structure with respect to said ground-plane and to provide a greater area to distribute the load of the combined weight of a loop and said enclosing structure over said ground-plane than that provided by an enclosing structure without said feet means.

2. The loop enclosure of claim 1 wherein said hoop means is positioned within said enclosing structure at a level to provide a loop of a predetermined height above said ground-plane.

3. The loop enclosure of claim 2 wherein said hoop means is attached to the rear inner surface of said enclosing structure and extends anteriorly towards said open front of said enclosing structure.

4. The loop enclosure of claim 2 wherein the axis of rotation of said hoop means is substantially normal to the plane of the rear wall of said enclosing structure thereby to position a loop in a plane substantially normal to said axis of rotation.

5. The loop enclosure of claim 4 wherein said hoop means is so dimensioned as to prevent a loop of a flexible energy conductor from being bent past the minimum allowable bending radius.

6. The loop enclosure of claim 5 wherein the radius of said hoop means is greater than the minimum allowable bending radius of a flexible energy conductor.

7. The loop enclosure of claim 4 wherein said feet means extend to the front and to the rear of said enclosing structure in a plane substantially parallel to said axis of said hoop means.

8. The loop enclosure of claim 1 wherein said movable cover means is a cover plate.

9. The loop enclosure of claim 1 wherein said open bottom below-ground-plane portion is closed on all sides and said open front only extends upwards from a point above said open bottom below-ground-plane portion, said movable cover means covering the opening defined by said open front without extending below said above-ground-plane portion.

10. In an energy distribution system buried beneath the ground-plane and having a source of energy, a flexible energy conductor connected to said source of energy buried beneath said ground-plane, loops of said energy conductor extending above said ground-plane at selected locations for subsequent connection to a secondary conductor and an individual conductor loop enclosure for enclosing each of said conductor loops, each of said conductor loop enclosures comprising:
    (a) an enclosing structure inserted about a conductor loop having an open front above-ground-plane portion and an open bottom below-ground-plane portion extending a predetermined distance below said ground-plane;
    (b) movable cover means to close off said open front of said enclosing structure;
    (c) hoop means within said enclosing structure having a depth substantially equal to the inside depth of said enclosing structure on which said loop is placed in a freely movable mode for its support and on which hoop means said loop is completely captured within said enclosing structure when said cover means is in place thereby holding said enclosing structure fixed in place by the combined anchoring effect of said conductor loop and said buried conductor; and,
    (d) feet means attached to said enclosing structure at the junction of the above-ground-plane portion and the below-ground-plane portion of said enclosing structure arranged so as to both correctly locate said enclosing structure with respect to said ground plane and to provide a greater area to distribute the load of the combined weight of said loop and said enclosing structure over said ground-plane than that provided by an enclosing structure without said feet means.

11. A system in accordance with claim 10 wherein a plurality of said conductor loop enclosures of similar dimension are provided to ensure uniform conductor loops throughout said system.

12. A system in accordance with claim 11 wherein said hoop means identically dimensioned and located within each of said plurality of loop enclosures.

13. A system in accordance with claim 11 wherein said loop enclosures are located with the axis rotation of said hoop means substantially normal to the direction of said buried flexible energy conductor at their points of installation.

14. A system in accordance with claim 11 wherein said hoop means are identically located with respect to said ground plane.

15. A system in accordance with claim 10 wherein said system is constructed to distribute electrical energy.

16. The system of claim 15 wherein said flexible energy conductor an electrical conductor having at least one strand.

17. The system of claim 16 wherein said electrical conductor is a multi-strand cable.

18. The system of claim 16 wherein said electrical conductor is a coaxial cable.

19. The system of claim 15 wherein said system is constructed for the purpose of supplying power.

20. The system of claim 15 which includes means whereby said electrical energy is modulated to provide useful information.

21. A system in accordance with claim 10 wherein said system is constructed to distribute light energy.

22. The system of claim 21 wherein said flexible energy conductor is a fiber optic cable.

23. The system of claim 21 which includes means whereby said light energy is modulated to provide useful information.

24. A system in accordance with claim 10 wherein said source of energy is in a gaseous state.

25. The system of claim 24 wherein said flexible energy conductor is a flexible pipe gas line.

* * * * *